(12) United States Patent
Kotra et al.

(10) Patent No.: US 11,921,634 B2
(45) Date of Patent: Mar. 5, 2024

(54) LEVERAGING PROCESSING-IN-MEMORY (PIM) RESOURCES TO EXPEDITE NON-PIM INSTRUCTIONS EXECUTED ON A HOST

(71) Applicant: ADVANCED MICRO DEVICES, INC., Santa Clara, CA (US)

(72) Inventors: Jagadish B. Kotra, Austin, TX (US); John Kalamatianos, Boxborough, MA (US); Yasuko Eckert, Redmond, WA (US); Yonghae Kim, Suwanee, GA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 128 days.

(21) Appl. No.: 17/564,155

(22) Filed: Dec. 28, 2021

(65) Prior Publication Data
US 2023/0205693 A1 Jun. 29, 2023

(51) Int. Cl.
*G06F 12/0811* (2016.01)
(52) U.S. Cl.
CPC ................. *G06F 12/0811* (2013.01)
(58) Field of Classification Search
None
See application file for complete search history.

(56) References Cited

U.S. PATENT DOCUMENTS

| | | | |
|---|---|---|---|
| 5,903,916 A | 5/1999 | Pawlowski et al. | |
| 6,553,465 B1 | 4/2003 | Takusagawa | |
| 6,944,746 B2 | 9/2005 | So | |
| 7,047,393 B2 | 5/2006 | Paver et al. | |
| 8,359,462 B1 | 1/2013 | Khan et al. | |
| 11,355,170 B1 * | 6/2022 | Yudanov | G11C 11/4085 |
| 11,625,249 B2 | 4/2023 | Kotra et al. | |
| 2005/0015538 A1 | 1/2005 | Van't Wout et al. | |
| 2005/0246698 A1 | 11/2005 | Chung | |

(Continued)

FOREIGN PATENT DOCUMENTS

| | | |
|---|---|---|
| WO | 2014120193 A1 | 8/2014 |
| WO | 2022132795 A1 | 6/2022 |
| WO | 2022146793 A1 | 7/2022 |

OTHER PUBLICATIONS

International Search Report and Written Opinion, PCT/US2022/052886, dated Mar. 20, 2023, 11 pages.

(Continued)

*Primary Examiner* — Kaushikkumar M Patel

(57) ABSTRACT

Leveraging processing-in-memory (PIM) resources to expedite non-PIM instructions executed on a host is disclosed. In an implementation, a memory controller identifies a first write instruction to write first data to a first memory location, where the first write instruction is not a processing-in-memory (PIM) instruction. The memory controller then writes the first data to a first PIM register. Opportunistically, the memory controller moves the first data from the first PIM register to the first memory location. In another implementation, a memory controller identifies a first memory location associated with a first read instruction, where the first read instruction is not a processing-in-memory (PIM) instruction. The memory controller identifies that a PIM register is associated with the first memory location. The memory controller then reads, in response to the first read instruction, first data from the PIM register.

31 Claims, 8 Drawing Sheets

(56) References Cited

U.S. PATENT DOCUMENTS

| | | | |
|---|---|---|---|
| 2008/0046692 | A1 | 2/2008 | Michalak et al. |
| 2017/0060588 | A1 | 3/2017 | Choi |
| 2017/0123987 | A1* | 5/2017 | Cheng ................ G06F 15/7821 |
| 2018/0089081 | A1 | 3/2018 | Ramalingam |
| 2018/0188961 | A1 | 7/2018 | Venkatesh et al. |
| 2018/0336035 | A1 | 11/2018 | Choi et al. |
| 2019/0138313 | A1 | 5/2019 | Lin |
| 2019/0377580 | A1 | 12/2019 | Vorbach et al. |
| 2020/0035291 | A1 | 1/2020 | Kasibhatla et al. |
| 2020/0174931 | A1 | 6/2020 | Williams et al. |
| 2020/0218540 | A1 | 7/2020 | Kesiraju et al. |
| 2021/0349826 | A1* | 11/2021 | Roy .................... G06F 13/1668 |
| 2022/0156081 | A1* | 5/2022 | Seo .................... G06F 15/7821 |
| 2022/0188117 | A1 | 6/2022 | Kalamatianos et al. |
| 2022/0188233 | A1 | 6/2022 | Kalamatianos et al. |
| 2022/0206817 | A1 | 6/2022 | Kotra et al. |
| 2022/0206855 | A1 | 6/2022 | Challapalle et al. |
| 2022/0292033 | A1* | 9/2022 | Yu ........................ G06F 9/3016 |

OTHER PUBLICATIONS

Santos et al., "Processing in 3D memories to speed up operations on complex data structures," 2018 Design, Automation & Test in Europe Conference & Exhibition (Date), Date of Conference: Mar. 19-23, 2018, Dresden, Germany, DOI: 10.23919/DATE.2018. 8342135, Date Added to IEEE Xplore: Apr. 23, 2018, 4 pages.

Aga et al., "Co-ML: A Case for Collaborative ML Acceleration using Near-Data Processing", MemSys '19: Proceedings of the International Symposium on Memory Systems, DOI: 10.1145/3357526.3357532, dated Sep. 2019, 12 pages.

Ahn et al., "PIM-Enabled Instructions: A Low-Overhead, Locality-Aware Processing-in-Memory Architecture", 2015 ACM/IEEE 42nd Annual International Symposium on Computer Architecture (ISCA), DOI:10.1145/2749469.2750385, Jun. 2015, 13 pages.

Boroumand et al., "LazyPIM: Efficient Support for Cache Coherence in Processing-in-Memory Architectures", IEEE Computer Architecture Letters, vol. 16, Issue 1, DOI:10.1109/LCA.2016. 2577557, dated Jun. 2016, 12 pages.

Denby et al., "Orbital Edge Computing: Nanosatellite Constellations as a New Class of Computer System", Proceedings of the Twenty-Fifth International Conference on Architectural Support for Programming Languages and Operating Systems (ASPLOS '20), Mar. 2020, pp. 939-954, IEEE, United States, URL: https://doi.org/10.1145/3373376.3378473.

Farmahini-Farahani et al., "NDA: Near-DRAM Acceleration Architecture Leveraging Commodity DRAM Devices and Standard Memory Modules", 2015 IEEE 21st International Symposium on High Performance Computer Architecture (HPCA), DOI: 10.1109/HPCA. 2015.7056040, dated Mar. 2015, 13 pages.

Gao et al., "ComputeDRAM: In-Memory Compute Using Off-the-Shelf DRAMs", Proceedings of the 52nd Annual IEEE/ACM International Symposium on Microarchitecture (MICRO '52), Oct. 2019, pp. 100-113, IEEE, URL: https://doi.org/10.1145/3352460. 3358260.

Ghose et al., "A Workload and Programming Ease Driven Perspective of Processing-in-Memory", IBM Journal of Research & Development, vol. 63, Issue: 6, Nov. 2019, IBM, United States.

Ghose et al., "Enabling the Adoption of Processing-in-Memory: Challenges, Mechanisms", Future Research Directions, Carnegie Mellon University Invited Book Chapter, 45 pages, Feb. 2018, Cornell University (online: arXiv.org), URL: https://arxiv.org/pdf/1802.00320.pdf.

IBM Corporation, "dcbf (Data Cache Block Flush) instruction", IBM Documentation, URL: https://www.ibm.com/docs/en/aix/7.2?topic=set-dcbf-data-cache-block-flush-instruction, 2020, printed May 4, 2021, 3 pages.

IBM Corporation, debi (Data Cache Block Invalidate) instruction, IBM Documentation, URL: https://www.ibm.com/docs/en/aix/7.2?topic=set-dcbi-data-cache-block-invalidate-instruction, 2020, printed May 4, 2021, 3 pages.

Islam et al., "Improving Node-Level MapReduce Performance Using Processing-in-Memory Technologies", European Conference on Parallel Processing (Euro-Par 2014: Parallel Processing Workshops), pp. 425-437, Springer International Publishing, Switzerland.

Kim, "A Journey to a Commercial-Grade Processing-In-Memory (PIM) Chip Development", The 27th IEEE International Symposium on High-Performance Computer Architecture (HPCA-27), Mar. 2021, Samsung, Seoul, South Korea, URL: https://hpca-conf.org/2021/keynotes/, 3 pages (abstract only, specifically pp. 2-3).

Loh et al., "A Processing-in-Memory Taxonomy and a Case for Studying Fixed-function PIM", 3rd Workshop on Near-Data Processing, Dec. 2013, 4 pages, University of Utah.

Mutlu et al., "Enabling Practical Processing in and near Memory for Data-Intensive Computing", Proceedings of the 56th Annual Design Automation Conference (DAC '19), Jun. 2019, Article No. 21 pp. 1-4, https://doi.org/10.1145/3316781.3323476.

Mutlu et al., "Processing Data Where It Makes Sense: Enabling In-Memory Computation", Journal of Microprocessors and Microsystems, vol. 67, Jun. 2019, pp. 28-41, Elsevier B.V., Amsterdam, The Netherlands.

Nyasulu, "System Design for a Computational-RAM Login-In-Memory Parallel Processing Machine", PHD Thesis, May 1999, 196 pages, Carleton University, Ottawa, ON, Canada.

Pugsley et al., "Analyzing the Impact of 3D-stacked Memory+Logic Devices on MapReduce Workloads", 2014 IEEE International Symposium on Performance Analysis of Systems and Software (ISPASS), Marcy 2014, pp. 190-200, IEEE, United States.

Seshadri et al., "RowClone: Fast and Energy-Efficient In-DRAM Bulk Data Copy and Initialization", 2013 46th Annual IEEE/ACM International Symposium on Microarchitecture (MICRO), DOI: 10.1145/2540708.2540725, dated Dec. 2013, 13 pages.

Singh et al., "A Review of Near-Memory Computing Architectures: Opportunities and Challenges", EuroMicro Conference on DSD, Aug. 2018, 10 pages, IEEE, United States, DOI: 10.1109/DSD. 2018.00106.

Yang et al., "A Processing-in-Memory Architecture Programming Paradigm for Wireless Internet-of-Things", Applications, Sensors Journal, Jan. 2019, 23 pages, MDPI, Basel, Switzerland.

Andi Kleen (andi@firstfloor.org), Memory Offlining, /sys/devices/system/memory/hard_offline_page, URL: https://www.kernel.org/doc/Documentation/ABI/testing/sysfs-memory-page-offline, dated Sep. 2009, 1 page.

International Search Report and Written Opinion, PCT/US2021/063345, dated Apr. 4, 2022, 9 pages.

International Search Report and Written Opinion, PCT/US2021/064663, dated May 10, 2022, 12 pages.

Jonathan Corbet, AutoNUMA: the other approach to NUMA scheduling, URL: https://lwn.net/Articles/488709/, dated Mar. 27, 2012, 5 pages.

Kwon et al., 25.4 A 20nm 6GB Function-In-Memory DRAM, Based on HBM2 with a 1.2TFLOPS Programmable Computing Unit Using Bank-Level Parallelism, for Machine Learning Applications, IEEE, 2021 IEEE International Solid-State Circuits Conference (ISSCC), URL: https://safari.ethz.ch/architecture_seminar/fall2021/lib/exe/fetch.php?media=kwon2021fimdram.pdf, DOI: 10.1109/ISSCC42613.2021.9365862, Date Added to IEEE Xplore: Mar. 3, 2021, 3 pages.

Nam Sung Kim, A Journey to a Commercial-Grade Processing-In-Memory (PIM) Chip Development, HPCA 2021, The 27th IEEE International Symposium on High-Performance Computer Architecture (PCA-27), Seoul, South Korea, URL: https://hpca-conf.org/2021/keynotes/, dated Mar. 3, 2021, 3 pages.

* cited by examiner

LEVERAGING PROCESSING-IN-MEMORY (PIM) RESOURCES TO EXPEDITE NON-PIM INSTRUCTIONS EXECUTED ON A HOST

BACKGROUND

Computing systems often include a number of processors, which can retrieve and execute instructions and store the results of the executed instructions to a suitable location. A processor (e.g., central processing unit (CPU) or graphics processing unit (GPU)) can comprise a number of functional units such as arithmetic logic unit (ALU) circuitry, floating point unit (FPU) circuitry, and/or a combinatorial logic block, for example, which can be used to execute instructions by performing arithmetic operations on data. For example, functional unit circuitry can be used to perform arithmetic operations such as addition, subtraction, multiplication, and/or division on operands. Typically, the processors are coupled to an external memory, and data is accessed via a bus or interconnect between the processors and the memory to execute a set of instructions. To reduce the number of accesses to fetch or store data in the memory, computing systems can employ a cache hierarchy that temporarily stores recently accessed or modified data for use by a processor or a group of processors. However, processing performance can be further improved by offloading certain operations to a memory-centric execution unit in which processing resources are implemented within and/or near to a memory, such that data processing is performed closer to the memory location storing the data rather than bringing the data closer to the processor. A memory-centric execution device can save time by reducing external communications (i.e., processor to memory communications) and can also conserve power.

One platform for memory-centric processing is a processing-in-memory (PIM) architecture. PIM architectures support the execution of memory intensive tasks while alleviating the workload on the host processor. For example, processor cores can implement an instruction set architecture (ISA) that includes special instructions, such as PIM instructions, to offload operations to a memory-centric processor, such as a PIM unit. When a processor core executes a PIM instruction, the operation indicated in the PIM instruction is not executed on the processor core. Instead, the PIM instruction is offloaded to the PIM unit within a PIM-enabled memory device for execution. Once the PIM instruction is complete in a processor core, a memory controller issues a PIM instruction that includes a PIM command, operand values and memory addresses, and other metadata. Upon receiving the PIM instruction, the PIM unit carries out the specified PIM operation. To perform PIM operations, the PIM unit includes an arithmetic logic unit and register file for holding operand values received from the core as well as intermediate values of PIM operations. In one example, one PIM unit is provided in each memory bank.

Applications or compiled code can include PIM code to utilize the PIM resources for memory intensive tasks. However, not all parts of an application are amenable for acceleration using PIM. In addition, there are applications with no code amenable to PIM acceleration. When the processor cores are not issuing PIM instructions to a memory bank, the PIM resources sit idle and the PIM registers in the PIM register file go unused.

DETAILED DESCRIPTION

Figure 1:
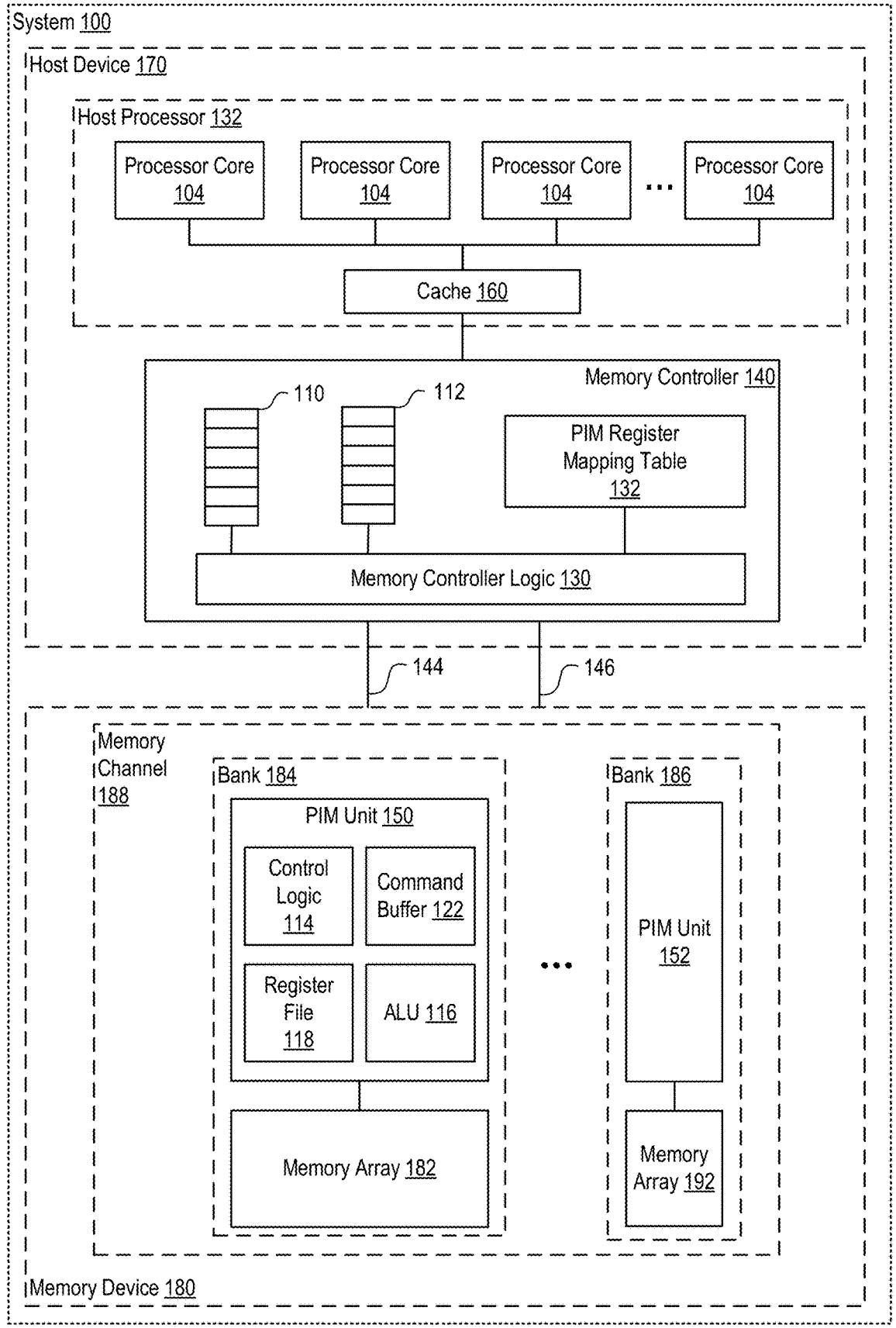
FIG. 1 sets forth a block diagram of an example system for leveraging processing-in-memory (PIM) resources to expedite non-PIM instructions executed on a host according to implementations of the present disclosure.

Implementations in accordance with the present disclosure are directed to the utilization of processing-in-memory (PIM) resources, such as PIM registers, to expedite non-PIM memory instructions. In various implementations, PIM registers are used to buffer data for non-PIM read instructions and non-PIM write instructions such that data can be transferred between the PIM registers and a memory array opportunistically, for example, when a bank is idle or when a memory row is already open. In some implementations, PIM registers are used as a write buffer to increase the rate at which non-PIM write instructions are drained from memory controller write queues. Writing data to PIM registers is faster than reading from memory because it does not require opening and closing memory rows. The data written to the PIM register can be to the memory array when, for example, the memory bank is idle. In other implementations, PIM registers are used as read buffers (e.g., staging buffers, early fetch buffers, prefetch buffers, and/or a memory-side cache) to reduce read latency. Data targeted by non-PIM read instructions can be read into PIM registers in advance of picking the non-PIM read instruction for dispatch by the memory controller. When the non-PIM read instruction is ready to be picked at the memory controller, the data is read from the PIM registers, which is faster because it does not require opening and closing memory rows. Additional features and advantages of the implementations will be recognized by those of skill in the art in view of the following disclosure.

An implementation is directed to a method of leveraging processing-in-memory (PIM) resources to expedite non-PIM instructions executed on a host. The method includes identifying a first write instruction to write first data to a first memory location, where the first write instruction is not a processing-in-memory (PIM) instruction. The method also includes writing the first data to a first PIM register. The method further includes moving the first data from the first PIM register to the first memory location. In one variation, the first data is moved to the first memory location during a bank idle period. In another variation, the first data is written to the first PIM register during a bank refresh period. In yet another variation, the first data is moved to the first memory location while a memory channel is in a read mode. In additional variations, the first data is written to the first PIM register by dispatching a PIM write instruction and the first data is stored at the first memory location by dispatching a PIM store instruction.

In some variations, writing the first data to the first PIM register includes updating a PIM register mapping table to include a first entry associating the first PIM register with the first memory location. In some variations, the method further includes identifying, in the PIM register mapping table, a second entry associating a second PIM register with a second memory location. In these variations, the first memory location and the second memory location are included in one memory row. In these variations, the method further includes moving second data in the second PIM register to the second memory location during a row activation phase in which the first data is moved to the first memory location.

Another implementation is directed to another method of leveraging processing-in-memory (PIM) resources to expedite non-PIM instructions executed on a host. The method includes identifying a first memory location associated with a first read instruction, where the first read instruction is not a PIM instruction. The method also includes identifying that a PIM register is associated with the first memory location. The method further includes reading, in response to the first read instruction, first data from the PIM register. In some variations, an entry in a PIM register mapping table associates the first PIM register with the first memory location. In some variations, the first data is read from the PIM register by dispatching a PIM read instruction.

In some variations, the method further includes loading the first data from the first memory location into the PIM register. In these variations, the method also includes updating a PIM register mapping table to include an entry that associates the PIM register and the first memory location. In some variations, the first data is loaded into the PIM register by dispatching a PIM load instruction. In some variations, the first data is loaded into the PIM register while a memory channel is in write mode and the first data is read from the PIM register while the memory channel is in a read mode. In some variations, the first data is loaded into the PIM register speculatively.

In some variations, the method further includes reading second data from a second memory location, where the first memory location and the second memory location correspond to sequential columns in a memory row. In these variations, the first data is loaded from the first memory location into the PIM register while the second data is read from the second memory location. In some variations, a single command is dispatched to read the second data from the second memory location and load the first data from the first memory location. In some variations, a single command is dispatched to read the first data from PIM register and close the memory row.

Yet another implementation is directed to an apparatus for leveraging processing-in-memory (PIM) resources to expedite non-PIM instructions executed on a host. The apparatus includes a processor and a memory controller coupled to the processor. The memory controller includes logic configured to identify a first write instruction to write first data to a first memory location, where the first write instruction is not a processing-in-memory (PIM) instruction. The logic is also configured to write the first data to a first PIM register. The logic is further configured to move the first data from the first PIM register to the first memory location. In one variation, the first data is moved to the first memory location during a bank idle period. In another variation, the first data is written to the first PIM register during a bank refresh period. In yet another variation, the first data is moved to the first memory location while a memory channel is in a read mode. In additional variations, the first data is written to the first PIM register by dispatching a PIM write instruction and the first data is stored at the first memory location by dispatching a PIM store instruction.

In some variations, writing the first data to the first PIM register includes updating a PIM register mapping table to include a first entry associating the first PIM register with the first memory location. In some variations, the logic is further configured to identify, in the PIM register mapping table, a second entry associating a second PIM register with a second memory location. In these variations, the first memory location and the second memory location are included in one memory row. In these variations, the logic is further configured to move second data in the second PIM register to the second memory location during a row activation phase in which the first data is moved to the first memory location.

Yet another implementation is directed to another apparatus for leveraging processing-in-memory (PIM) resources to expedite non-PIM instructions executed on a host. The apparatus includes a processor and a memory controller coupled to the processor. The memory controller includes logic configured to identify a first memory location associated with a first read instruction, where the first read instruction is not a PIM instruction. The logic is also configured to identifying that a PIM register is associated with the first memory location. The logic is further configured to read, in response to the first read instruction, first data from the PIM register. In some variations, an entry in a PIM register mapping table associates the first PIM register with the first memory location. In some variations, the first data is read from the PIM register by dispatching a PIM read instruction.

In some variations, the logic is further configured to load the first data from the first memory location into the PIM register. In these variations, the logic is further configured to update a PIM register mapping table to include an entry that associates the PIM register and the first memory location. In some variations, the first data is loaded into the PIM register by dispatching a PIM load instruction. In some variations, the first data is loaded into the PIM register while a memory channel is in write mode and the first data is read from the PIM register while the memory channel is in a read mode. In some variations, the first data is loaded into the PIM register speculatively.

In some variations, the logic is further configured to read second data from a second memory location, where the first memory location and the second memory location correspond to sequential columns in one memory row. In these variations, the first data is loaded from the first memory location into the PIM register while the second data is read from the second memory location. In some variations, a single command is dispatched to read the second data from the second memory location and load the first data from the first memory location. In some variations, a single command is dispatched to read the first data from PIM register and close the memory row.

Implementations in accordance with the present disclosure will be described in further detail beginning with FIG. 1. Like reference numerals refer to like elements throughout the specification and drawings. FIG. 1 sets forth a block diagram of an example system 100 for leveraging processing-in-memory (PIM) resources to expedite non-PIM instructions executed on a host in accordance with the present disclosure. The example system 100 of FIG. 1 includes a host device 170 having a processor 132 that includes one or more processor cores 104. While four processor cores are depicted in FIG. 1, it should be understood that the host device 170 can include more or fewer processor cores than depicted. In various examples, the processor cores 104 are CPU cores, GPU cores, or other cores known to those of ordinary skill in the art. The processor cores 104 issue memory instructions or commands to transfer data between the processor 132 and a memory device 180 by, for example, reading data stored in the memory device into a processor cache or writing data in a processor cache to the memory device. These operations a typically performed through conventional load and store instructions that are dispatched by a memory controller 140 to the memory device 180 through a last level cache 160 shared by the cores 104. In some examples, the host device 170 includes one memory controller 140 per memory channel 188, where a memory channel corresponds to one or more banks 184, 186 or some other memory partition. The memory controller 140 maintains one or more dispatch queues such as a write queue 110 and a read queue 112 for queuing memory instructions to be dispatched to a memory channel or other memory partition. A command bus 144 provides an interface between memory controller 140 and the memory device for dispatching memory instructions and commands. A data bus 146 provides an interface for transferring data between the memory device 180 and the host device 170.

In the example of FIG. 1, the memory device 180 is a PIM-enabled memory device that includes at least one PIM unit 150 to execute the PIM instructions dispatched by the processor cores 104. For example, the processor cores 104 can be CPU, GPU, or accelerator cores. The PIM unit 150 is characterized by faster access to data relative to the host processor 132. Thus, the PIM unit 150 can operate at the direction of the processor cores 104 to execute memory intensive tasks. In the example of FIG. 1, PIM units 150, 152 are coupled to respective memory arrays 182, 192 (e.g., DRAM arrays). The memory arrays 182, 192 can be one or more arrays of memory cells of a bank, channel, or other memory hierarchy partition in the memory device 180. Without loss of generality, in this particular example it is assumed that each PIM unit 150, 152 is coupled to a respective memory bank 184, 186 that includes a memory array 182, 192. Readers of skill in the art will appreciate that various configurations of PIM modules and memory partitions (physical or logical) in a PIM-enabled memory device can be employed without departing from the spirit of the present disclosure. The PIM-enabled memory device 180 can be a memory device such as a double data rate (DDRx) memory device, graphics DDRx (GDDRx) memory device, low power DDRx (LPDDRx) memory device, high bandwidth memory (HBM) device, hybrid memory cube (HMC) device, Non-Volatile Random Access Memory (NV-RAM) device, or other memory devices that supports PIM. Although the examples herein are provided in the context of a PIM platform, it will be appreciated that these examples are applicable to other types of memory-centric processing platforms, such as process-near-memory (PNM).

In some implementations, the PIM unit 150 includes control logic 114 for decoding instructions or commands issued from the processor cores 104 (e.g. command decoder), an arithmetic logic unit (ALU) 116 that performs an operation indicated in the PIM instruction, and a PIM register file 118 including a plurality of indexed registers for holding data for load/store operations to memory or intermediate values of ALU computations. In some examples, the ALU 116 is capable performing a limited set of operations relative to the ALUs of the processor cores 104, thus making the ALU 116 less complex to implement and, for example, more suited for an in-memory implementation. A PIM instruction can move data between the PIM registers and the memory array, and it can also trigger computation on this data in the ALU 116. In some examples, the PIM unit 150 also includes a command buffer 122 that stores PIM instructions written into the command buffer 122 by the host device 170. In some examples, the host processor 132 issues PIM instructions to the ALU 116 of each execution unit 150. In implementations with a command buffer 122, the host processor 132 issues commands that include an index into a line of the command buffer holding the operation to be executed by the ALU 116. In these implementations with a command buffer 122, the host-memory interface does not require modification with additional commands pins to cover all the possible opcodes needed for PIM operations.

In some examples, the memory device 180 includes one PIM unit 150, 152 per DRAM component (e.g., bank, channel, chip, rank, module, die, etc.). In some implementations, PIM instructions issued from the processor cores 104 can access data from DRAM bank by opening/closing rows and reading/writing columns (like conventional DRAM commands do). In these implementations, each PIM instruction carries a target address, which is also used to direct the PIM instruction to the appropriate PIM unit, as well as the operation to be performed using data at the target address. A PIM unit 150 can operate on a distinct subset of the physical address space. For example, when a PIM instruction reaches the execution unit 150, it can be serialized with other PIM instructions and memory accesses to DRAM targeting the same subset of the physical address space.

Figure 2:
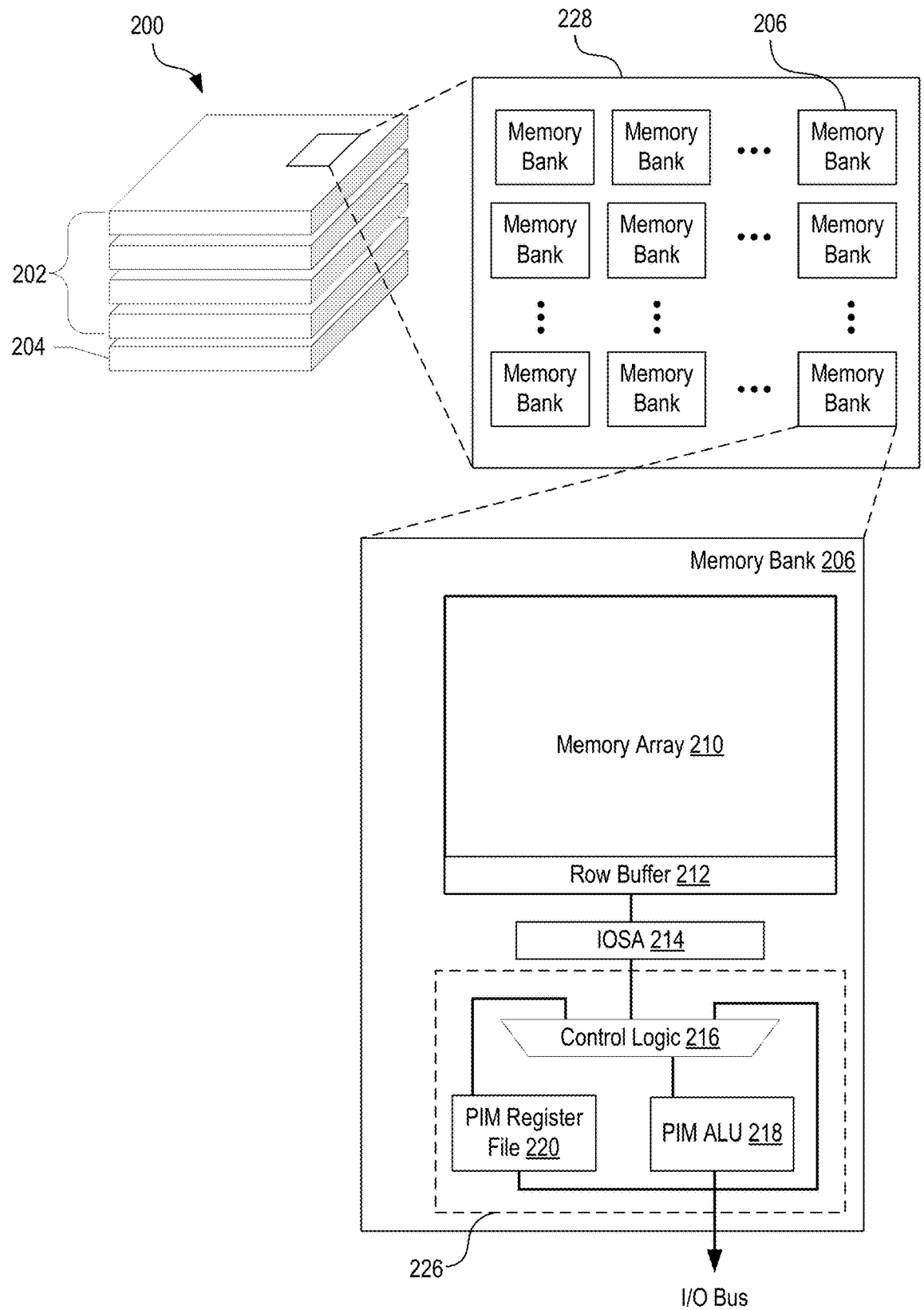
FIG. 2 sets forth a block diagram of example memory system that supports leveraging PIM resources to expedite non-PIM instructions executed on a host according to implementations of the present disclosure.

For further explanation FIG. 2 sets forth a block diagram of an example of a PIM-enabled memory system 200 in accordance with implementations of the present disclosure. In the example depicted in FIG. 2, the PIM-enabled memory system 200 is implemented as an HBM system that includes multiple memory dies 202 (e.g., DRAM cores) stacked on a memory interface die 204 (e.g., a base logic die). A memory die 202 includes multiple memory banks 206 that are organized into channels or pseudo channels where memory banks in a channel or pseudo channel share an I/O bus. In the example depicted in FIG. 2, a pseudo channel 228 includes a number of memory banks 206, although readers will appreciate that the number of memory banks in a channel or pseudo channel can be selected by the memory system designer. The I/O bus is implemented by TSVs that connect each memory die 202 to the memory interface die 204. The memory interface die 204 is communicatively coupled to host processor system (e.g., the host device 170 of FIG. 1) through a high-speed link (e.g., an interposer wafer, die-to-die interconnect, etc.). Commands and data that are received from a memory controller (e.g., memory controller 140 of FIG. 1) at the memory interface die 204 and routed to the appropriate channel or pseudo channel in a memory die 202, and to the target memory bank. The commands and data can include PIM commands and host-based data for executing those PIM commands in the PIM-enabled memory system 200.

In some examples, a memory bank 206 includes a memory array 210 that is a matrix of memory bit cells with word lines (rows) and bit lines (columns) that is coupled to a row buffer 212 that acts as a cache when reading or writing data to/from the memory array 210. For example, the memory array 210 can be an array of DRAM cells. The memory bank 206 also includes an I/O line sense amplifier (IOSA) 214 that amplifies data read from the memory array 210 for output to the I/O bus (or to a PIM unit, as will be described below). The memory bank 206 also includes additional components not shown here (for ease of understanding), such as a row decoder, column decoder, command decoder, as well as additional sense amplifiers, drivers, signals, and buffers.

In some implementations, a memory bank 206 includes a PIM unit 226 that performs PIM computations using data stored in the memory array 210. The PIM unit 226 includes a PIM ALU 218 capable of carrying out basic computations within the memory bank 206, and a PIM register file 220 that includes multiple PIM registers for storing the result of a PIM computation as well as for storing data from the memory array and/or host-generated data that are used as operands of the PIM computation. The PIM unit 226 also includes control logic 216 for loading data from the memory array 210 and host-generated data from the I/O bus into the PIM register file 220, as well for writing result data to the memory array 210. When a PIM computation or sequence of PIM computations is complete, the result(s) in the PIM register file 220 are written back to the memory array 210. By virtue of its physical proximity to the memory array 210, the PIM unit 226 is capable of completing a PIM task faster than if operand data were transmitted to the host for computation and result data was transmitted back to the memory array 210.

Returning to FIG. 1, in some implementations, the processor ISA defines a set of architected PIM registers (e.g., eight indexed registers) corresponding to the PIM register file 118. In some examples, the PIM memory instructions provided by the ISA include a PIM load instruction (e.g., PIM_Ld) to load data from the memory array 182 into a PIM register in the PIM register file 118, as well as a PIM store instruction ('PIM_St') to move data from a PIM register in the PIM register file 118 to the memory array 182. In some examples, PIM arithmetic instructions (e.g., 'PIM_Add,' 'PIM_Multiply,' etc.) provided by the ISA include instructions to be executed on the PIM ALU 116 using data store in the register file 118. In various examples, the operands of PIM instructions include architected PIM registers, memory addresses, and values from processor core 104 registers or other core-computed values. In some examples, the ISA further provides a PIM read instruction ('PIM_Read') that allows the memory controller 140 to read data directly from the PIM register file 118, and a PIM write instruction ('PIM_Write') that allows the memory controller 140 to write data directly to the PIM register file 118. Typically, such instructions are not used by applications or included in compiled PIM code because they require data to be transmitted over the data bus, which obviates the advantages provided by the PIM platform (e.g., minimizing host-memory data traffic, minimizing the associated energy costs, and reducing latency for these operations). Rather, PIM read and PIM write instructions are typically used for debugging of PIM code.

In some examples, when a processor core 104 issues a conventional instruction to read or an instruction to write data to the memory arrays 182, 192, the instruction is received by the memory controller 140. The memory controller then dispatches, in response to the read instruction or write instruction, a read command or a write command to the memory device 180. The memory controller can also dispatch commands to open and close rows in the memory array. In some examples, when a process core 104 issues a PIM instruction (e.g., PIM load instruction or a PIM store instruction), the PIM instruction is received by the memory controller 104. The memory controller then dispatches, in response to the PIM instruction, the corresponding PIM command (e.g., a PIM load command or a PIM store command) to a PIM unit (e.g., PIM unit 150 or 152) in the memory device 180. In the context of this disclosure, instructions issued by a processor core to read data from, or write data to, the memory array in the memory device 180 are referred to as 'non-PIM instructions,' in contrast to PIM instructions issued by a processor core 104 that are directed to a PIM unit in the memory device 180. As will be described in greater detail below, some implementations in accordance with the present disclosure provide a memory controller that dispatches a PIM command the memory device 180 in response to receiving non-PIM instructions from a processor core 104.

As previously mentioned, the PIM register file 118 is unused when not carrying out PIM operations (i.e., when the processor is not sending PIM instructions to the PIM unit 150). In accordance with the present disclosure, the memory controller 140 utilizes the PIM register file 118 to expedite non-PIM memory instructions, such as read and write instructions, directed to the memory device 180. As described above, the memory controller 140 dispatches PIM commands in response to receiving a PIM instruction from the processor 132. In accordance with the present disclosures, the memory controller 140 dispatches PIM commands that are not based on a PIM instruction received from the processor 132. That is, the memory controller 140 dispatches PIM commands to manage the PIM register file 118 for expediting non-PIM instructions. In some examples, PIM read commands and PIM write commands, along with PIM load commands and PIM store commands, are employed by the memory controller 140 to execute non-PIM read instructions and non-PIM write instructions using the PIM register file 118.

As used herein, 'dispatching' a non-PIM instruction or a PIM instruction can be carried out by the memory controller 140 issuing a memory command over a command bus 144 between the host device 170 and the memory device 180. As such, dispatching a non-PIM instruction can be interpreted as dispatching a non-PIM command (e.g., a non-PIM read or write command) to the memory device to carry out the memory operation specified in the non-PIM instruction received from the processor 132. Further, the memory controller 140 can dispatch a PIM command to the memory device to carry out a particular PIM operation, even where a corresponding PIM instruction was not received from the processor 132.

In some implementations, memory controller logic 130 uses the PIM register file 118 to buffer write operations in the memory device 180 for non-PIM write instructions. Typically, a memory controller 140 drains write instructions from the memory controller write queue 110 by switching the memory channel direction to a write mode. While the memory channel 188 is in the write mode, the memory controller 140 cannot read the data from the memory device. Thus, the amount of time the memory channel spends in the write mode is important as pending read operations are stalled. To reduce the amount of time the memory channel 188 spends in write mode, the memory controller logic 130 drains write instructions to the PIM register file 118 using PIM write commands. For example, where a non-PIM write instruction writes data to a target memory location in the memory array 182, the memory controller logic 130 instead writes the data to a PIM register using a PIM write command. Subsequently, the memory controller logic 130 moves the data from the PIM register to the target memory location in the memory array 182 using a PIM store command. This can be done opportunistically, such as when a memory channel or memory bank is idle. Moreover, the movement of the non-PIM instruction write data from the PIM register to the target memory location in the memory array 182 can be performed while the memory channel is in a read mode because the data operand is already present in the memory device 180. Writing data for non-PIM instructions into PIM registers reduces the amount of time the memory channel 188 spends in write mode because it does not require closing a currently open memory row and activating a destination memory row.

The use of PIM registers as a write buffer can also reduce read latency, for example, through store-to-load forwarding. In some examples, the memory controller logic 130 reads the buffered result of a non-PIM write instruction directly from PIM registers in response to a non-PIM read instruction. The memory controller logic 130 reads the buffered write data using a PIM Read command, which does not require closing a currently open memory row. In other examples, the memory controller logic 130 expedites a non-PIM read instruction by removing non-PIM write instructions from the critical path of the non-PIM read instruction. For example, where non-PIM write instructions incur a row buffer conflict with the non-PIM read instruction, the memory controller logic 130 drains the non-PIM write instructions to the PIM register file. Consider an example where two non-PIM write instructions write data to two DRAM columns A0 and A1 located at DRAM row 0 and row 1, respectively, followed by a non-PIM read instruction reading data from DRAM column P0 in DRAM row 2. Because all of these accesses are to different DRAM rows, they all incur row buffer conflicts. The pre-charge and activate for row 0 and row 1 fall on the critical path of access to column P0. However, the memory controller logic 130 reduces the number of cycles needed before the data at column P0 can be read by writing the data of the non-PIM write instructions to the PIM register file 118 using PIM write commands. Thus, a non-PIM read instruction reading data from column P0 in DRAM row 2 finishes earlier because it is not necessary to close and open DRAM rows for the two non-PIM write instructions. Thus, the latency for a more critical read to column P0 is reduced. The write data of the non-PIM write instructions can be drained to DRAM later, such as during a bank idle period.

The use of PIM registers as a write buffer also allows for write coalescing, which further reduces the amount of time spent in write mode, as multiple writes to the same data held in a PIM register do not require closing a currently open memory row and activating a destination row. In some examples, where multiple non-PIM instructions write data to the same memory row, either by overwriting to the same column or by writing different columns of the row, the memory controller logic 130 accumulates write data in a PIM register until those writes are opportunistically migrated to the memory row in the memory array 182 using a PIM store command.

In some implementations, memory controller logic 130 uses the PIM register file 118 to buffer or stage read operations in the memory device 182 for non-PIM read instructions. For example, in many cases, a non-PIM instruction to read data from a one column is followed by a non-PIM instruction to read data from the next column in the memory row. A PIM register can be used as an early fetch or prefetch buffer for this adjacent data. In some examples, the memory controller logic 130 dispatches a non-PIM read command to read data from a column in parallel with a PIM load command to load the next adjacent column in the row into a PIM register. To avoid widening the command bus to accommodate these parallel instructions, in some examples the memory controller logic 130 dispatches a single command that combines reading data from one column in the row over the data bus and loading data from the next column in the row into a PIM register. The data in the PIM register can be read using a PIM read command. Where the data held in the PIM register is the last data to be read from the row, that row can be closed earlier because the data in the PIM register can be read using a PIM read command. Accordingly, the next row can be opened earlier, and read latency for any reads from that next row is reduced. It should be noted that, although the data bus within the memory bank may need to be widened to accommodate the parallel reading of data from two columns, the width of the data bus between the host device 170 and the memory device 180 can remain unchanged. To further reduce latency, in some examples the memory controller logic 130 dispatches a single command that combined the PIM read command to read data from the PIM register and a pre-charge command to close the open row. This further reduces the number of cycles until the next row can be activated.

In some implementations, the memory controller logic 130 reduces read latency by using the PIM register file 118 as an early fetch buffer for staging reads. When writing data into the memory array, the memory controller logic 130 switches the direction of the memory channel 188 to write mode. Thus, during the write phase, the memory controller logic 130 does not issue reads to idle banks since the channel is in write mode and data cannot be read to the memory controller. However, the memory controller logic can dispatch PIM load commands over the command bus 144, which does not require any data to pass through the data bus 146. Thus, in some examples, the memory controller logic 130 stages a non-PIM read instruction during the write mode by dispatching a PIM load command to load the data from an idle bank into a PIM register. Consider an example where a non-PIM read instruction is pending in the memory controller read queue during write mode. The memory controller logic 130 dispatches a PIM load command to load the data from the memory location targeted by the non-PIM instruction into a PIM register. When the memory channel 188 switches back to read mode, the memory controller logic 130 reads the data from the PIM register, using a PIM read command, instead of reading the data from the memory location identified in the non-PIM instruction. Using the PIM read command does not incur pre-charge and activate latency on the critical path. This will reduce the average memory access latency for non-PIM read instructions and thereby improve performance and energy efficiency. Further, this flow can be non-speculative in implementations where the memory controller logic only dispatches PIM load commands to fetch data to PIM registers based on the read traffic in the memory controller queue.

In some implementations, the memory controller logic 130 uses the PIM register file 118 as a memory side cache or prefetch buffer. For example, the memory controller logic 130 can prepopulate, based on a speculative algorithm, the PIM register file 118 with data loaded using a PIM load command. If a non-PIM read instruction hits on the memory side cache, the memory controller logic can read the requested data from the PIM register file 118 using a PIM read command, which is faster than reading from the memory array because there is no need to open a memory row.

In some implementations, the memory controller 140 includes a PIM register mapping table 142 to facilitate the use of the PIM register file 118 for expediting non-PIM instructions. The PIM register mapping table 142 maps memory locations to PIM registers. For example, to utilize a PIM register as a write buffer for a non-PIM instruction, the memory controller logic 130 remaps the write destination of the write data from the target memory location of the non-PIM write instruction to a PIM register. The memory controller logic 130 writes the write data to the PIM register using a PIM write command and updates the PIM register mapping table 142 to include an association between that PIM register and the target memory location. The memory controller logic 130 then opportunistically moves the write data from the PIM register to the target memory location based on the association between the PIM register and the target memory location that is recorded in the PIM register mapping table. Similarly, for example, to utilize a PIM register as an early fetch or prefetch buffer, the memory controller logic 130 loads data from a memory location into a PIM register and updates the PIM register mapping table 142 to include an association between the PIM register and the memory location. When a non-PIM read instruction hits on the PIM register mapping table 142 (i.e., the target memory location of the non-PIM read instruction matches a memory location in the PIM register mapping table 142), the source of the non-PIM read instruction is remapped from the target memory location of the non-PIM read instruction to the PIM register associated with that memory location, and the data is read from the PIM register using a PIM read command. In some examples, the PIM register mapping table 142 includes multiple entries, where each entry maps a PIM register index to a memory location.

Consider an example where each PIM register in a DRAM bank is 32-bytes and each DRAM column is 64 bytes. Thus, there are a maximum of N PIM register mapping table entries per DRAM bank for a PIM register file with 2*N registers per DRAM bank. Accordingly, the memory controller logic 130 must track the physical addresses of M*N PIM registers where M is the number of DRAM banks per channel. For a DRAM configuration with 16 DRAM banks per channel and 16 registers per PIM register file per bank, the memory controller logic 130 must maintain a PIM register mapping table that includes 16*8=128 entries. In such an example, the PIM register mapping table 142 can be organized as a K-way set associative cache (K<N) with a number of sets equal to M. The index bits can be provided by the DRAM bank select bits (from the physical address of a memory instruction). The remaining physical address bits can serve as a tag. The PIM register index can be stored in each PIM register mapping table entry. Where K=N, the PIM register mapping table does not need to store the PIM register index because it is implied by each PIM register mapping table set (due to the one-to-one mapping between PIM registers across all banks and PIM register mapping table entries). In some implementations, each PIM register mapping table entry has a valid bit which is set if a PIM register is holding data that has been written to the PIM register via a PIM write command or loaded into the PIM register via a PIM load command. That is, the valid bit indicates whether the PIM register holds valid data related to a non-PIM instruction. The valid bit is reset whenever the data is flushed from the PIM register via a PIM store command or read from the PIM register via a PIM read command, thus freeing the PIM register for reuse.

Figure 3:
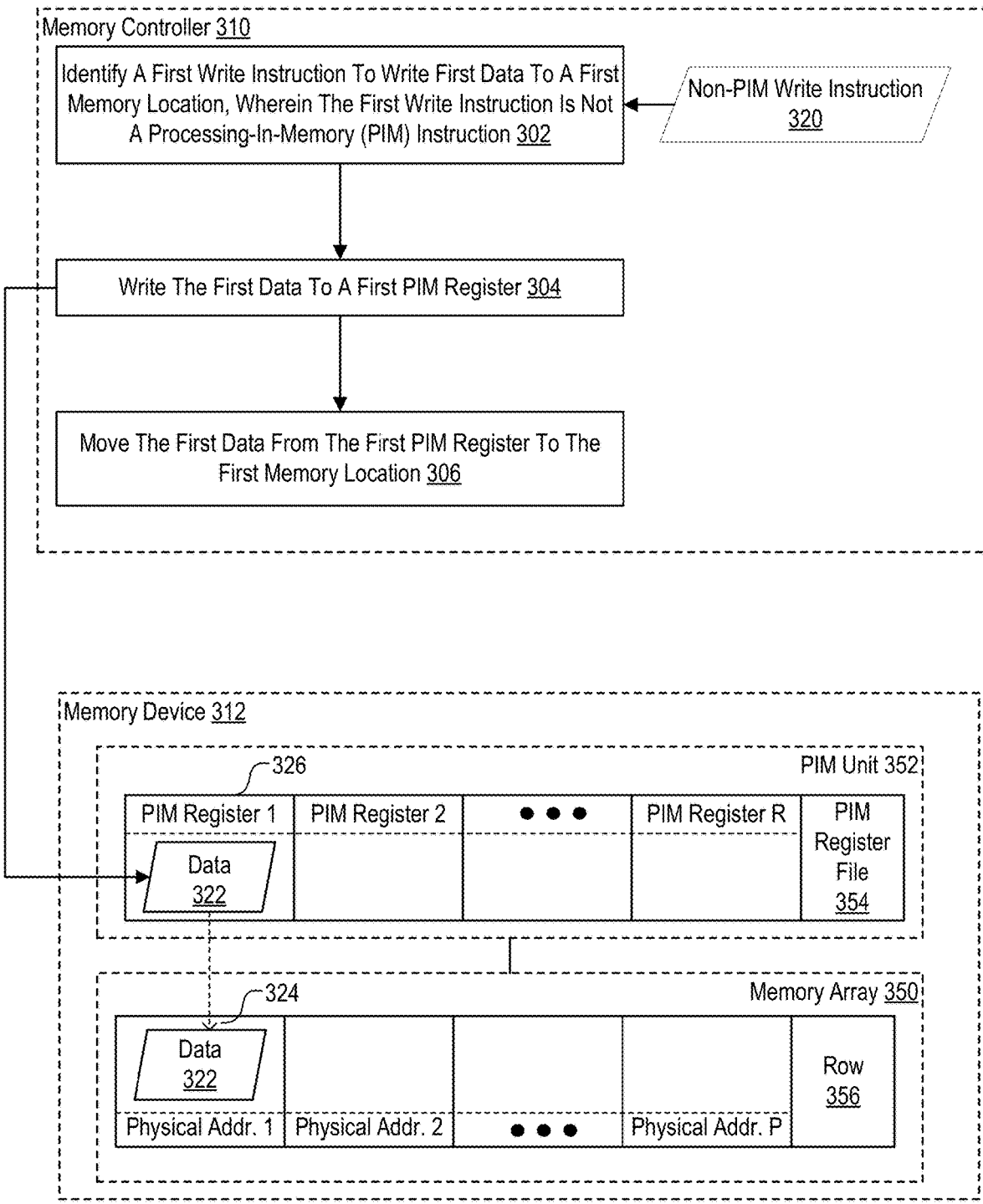
FIG. 3 a flow chart illustrating an example method of leveraging PIM resources to expedite non-PIM instructions executed on a host in accordance with implementations of the present disclosure.

For further explanation, FIG. 3 sets forth a flow chart and a memory device illustrating an example method for leveraging processing-in-memory (PIM) resources to expedite non-PIM instructions executed on a host according to some implementations of the present disclosure. The example of FIG. 3 includes a memory controller 310 that can be similar in some or all aspects to the memory controller 140 of FIG. 1, particularly in that the memory controller 310 is configured to dispatch PIM load commands and PIM store commands to move data between a memory location and a PIM register, as well as PIM read commands and PIM write commands to read data from and write data to a PIM register. The example of FIG. 3 also includes a PIM-enabled memory device 312 that can be similar in some or all aspects to the memory device 180 of FIG. 1, particularly in that the memory device 312 includes at least one memory array 350 (e.g., a DRAM bank) coupled to a PIM unit 352 that includes a PIM register file 354. A row 356 in the memory array 350 can include a range of physical addresses 1 to P. For example, a physical address can indicate a row-column address. Although only one row 356 is depicted for the purpose of explanation, it will be appreciated that a memory array will include thousands of rows. The PIM register file 354 includes PIM Registers 1 to R. In some examples, each PIM Register 1 to R is represented by a PIM register index.

The example method of FIG. 3 includes identifying 302 a first write instruction 320 to write first data 322 to a first memory location 324, wherein the first write instruction 320 is not a processing-in-memory (PIM) instruction. In some examples, the non-PIM write instruction 320 identifies a memory location 324 (e.g., a physical memory address) in a memory array of the memory device 312, as well as the data 322 (or a pointer to a data buffer holding the data) that is to be written to the memory location 324. For example, the write instruction 320 can specify the data 322 and a row-column address in a DRAM bank (e.g., 'physical address 1') that is the destination of the data 322. In some examples, non-PIM write instructions are queued in write queue when received at the memory controller 310. When the write instruction 320 advances to the head of the write queue, the memory controller 310 identifies the memory location 324 associated with the write instruction 320. In some implementations, identifying 302 the first write instruction 320 includes determining whether the write instruction 320 should be dispatched as a write to the memory location 324 or as a write to a PIM register 326.

In some examples, the memory controller 310 determines whether to write the data 322 to the memory location 324 or to a PIM register 326 based on the state of the row buffer in the memory bank that includes the memory location 324. For example, if the write to the memory location 324 incurs a row buffer penalty, the memory controller 310 can determine that the data 322 will be written to a PIM register 326. The row buffer penalty is incurred when the memory location 324 of the write instruction 320 is located in a different row than the row that is currently open in the row buffer. For example, if the memory device 312 is busy writing data to row 0 and physical address 1 of write instruction 320 is located in row 1, the memory controller must wait for the memory device 312 to complete the write to row 0, and then close row 0 and activate row 1 to write the data 322 to physical address 1. This process can require a number of memory cycles. However, the number of memory cycles required to write the data 322 to a PIM register is far less because there is no need to close row 0 and open row 1.

In some examples, the memory controller 310 determines whether to write the data 322 to the memory location 324 or to a PIM register 326 based on the memory locations for other write instructions in the write queue. Where the write queue includes multiple write instructions that target the same row, and those write instructions are interspersed with write instructions that target different rows, the memory controller 310 can determine that the write instructions that target the same row should be coalesced in the PIM registers. Although the memory controller 310 must maintain same address write ordering when dispatching write instructions, the memory controller 310 can group write instructions by draining them to PIM registers. Thus, write instructions that target the same row can be sent to PIM registers so they can be later drained to the same memory row.

In some examples, the memory controller 310 determines whether to write the data 322 to the memory location 324 or to a PIM register 326 based on the read instructions in the read queue. For example, if the memory controller 310 determines that a read instruction in the read queue will read the result of the write instruction 320, the memory controller 310 can write the data 322 associated with the write instruction 320 to a PIM register 326, thus allowing the pending read instruction to read data 322 from the PIM register, avoiding opening the memory row and thus reducing the latency of the read instruction. As another example, if the memory controller 310 determines that a pending read instruction should be expedited, the data 322 of the write instruction 320 can be written to a PIM register 326 so that the memory channel can be switched to read mode earlier than if the data were written to the memory location 324. This is because writing the PIM register 326 does not require closing a current row and activating the row that includes the memory location 324.

The method of FIG. 3 also includes writing 304 the first data 322 to a first PIM register 326. In some implementations, the memory controller 310 writes the first data 322 to the first PIM register 326 using a PIM write command that identifies a register index of the first PIM register 326 and the data 322 to be written to the first PIM register 326. In the example depicted in FIG. 3, the memory controller writes the data 322 to PIM Register 1.

In some implementations, the memory controller 310 writes 304 the first data 322 to a first PIM register 326 during a bank refresh operation. For example, some memory devices implement a per-bank refresh policy. During the refresh phase, the memory controller 310 activates a row into the row buffer and pre-charges it. In such an example, a refresh operation to refresh a set of rows from a bank lasts on the order of several nanoseconds. During this time, if the channel is in write mode and the non-PIM instruction 320 targets the bank being refreshed, the memory controller 310 writes the data 322 to the PIM register 326 using a PIM write command. In this way, the latency of the refresh operation overlaps with that of the PIM write instruction transferring data to the PIM register. The overlap is possible because the bank refresh is an internal memory operation and does not use the memory channel (data or command bus). In addition, PIM write instruction does not use the row buffer that the refresh operation utilizes.

The method of FIG. 3 also includes moving 306 the first data 322 from the first PIM register 326 to the first memory location 324. In some implementations, the memory controller 310 migrates the first data 322 to the first memory location using a PIM store command. For example, the PIM store command specifies the register index of the PIM register 326 that holds the data 322 and the memory location 324 that is the destination for the write instruction 320. In one example, moving 306 the first data 322 to the memory location 324 includes closing an open row and activating the DRAM row that includes the memory location 324 (unless that DRAM row was already open), then writing the data 322 to the row buffer, and ultimately closing the row. For example, as depicted in FIG. 3, the DRAM row 356 (which includes the memory location 324) is activated and the data 322 is moved from PIM Register 1 into the row 356. When the DRAM row 356 is closed, the data 322 is persisted at the memory location 324 in the row of the DRAM array. In some implementations, moving 306 the first data 322 to the memory location 324 is performed opportunistically. In one example, the first data 322 is moved to the memory location 324 while the memory bank is idle. In a further example, the first data 322 is moved to the memory location while the memory channel is in read mode.

Figure 4:
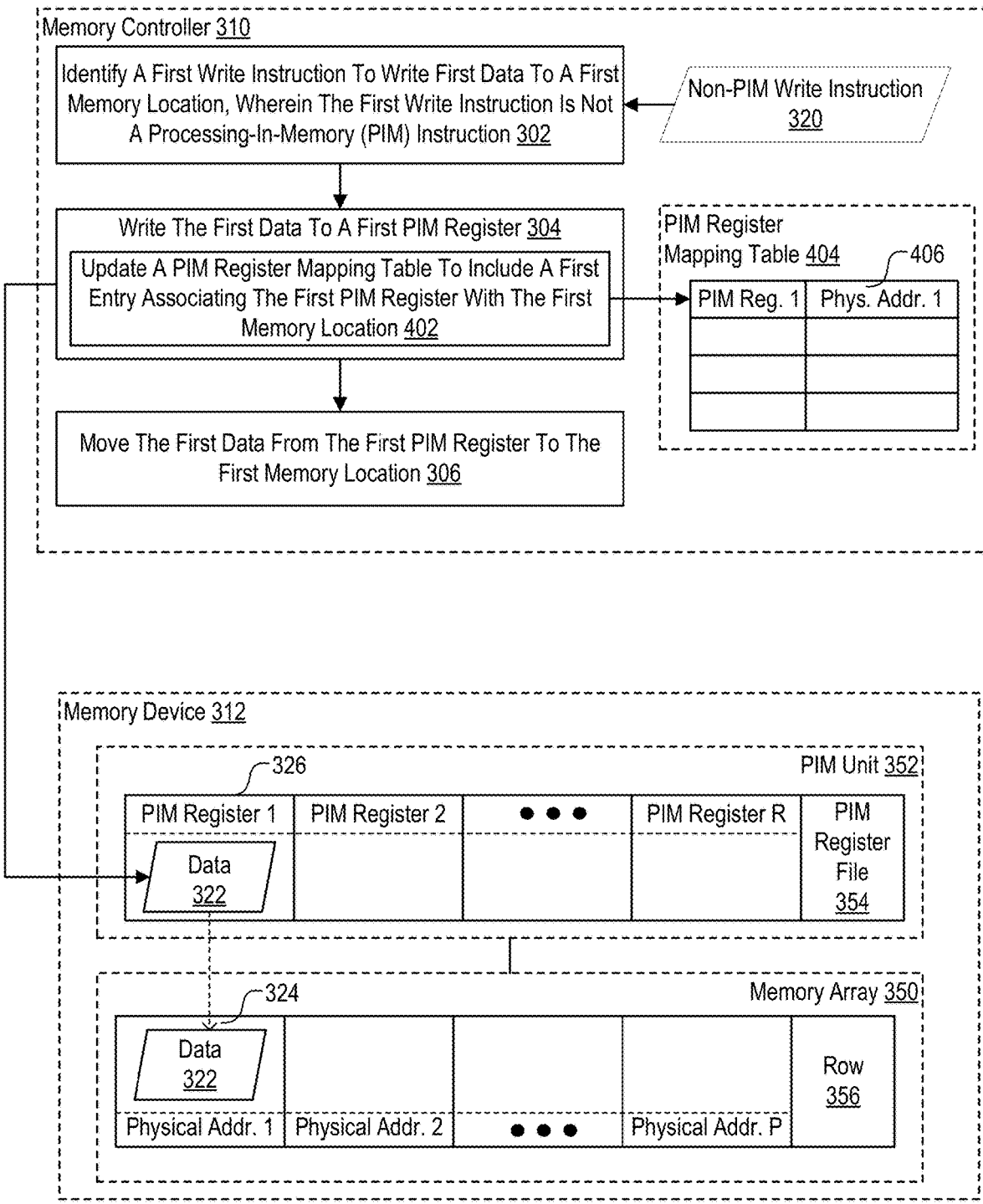
FIG. 4 sets forth a flow chart illustrating another example method of leveraging PIM resources to expedite non-PIM instructions executed on a host in accordance with implementations of the present disclosure.

For further explanation, FIG. 4 sets forth a flow chart illustrating an example method for leveraging processing-in-memory (PIM) resources to expedite non-PIM instructions executed on a host according to some implementations of the present disclosure. The method of FIG. 4 is similar to the method of FIG. 3. However, the method of FIG. 4 differs from the method of FIG. 3 in that writing 304 the first data 322 to a first PIM register 326 includes updating 402 a PIM register mapping table 404 to include an entry 406 associating the first PIM register 326 with the first memory location 324. In some variations, there is a one-to-one mapping between all PIM registers within the memory channel and PIM register mapping table entries. In these implementations, the memory controller 310 updates an entry 406 corresponding to the PIM register 326, which holds the data 322 for the non-PIM write instruction 320, with the memory location 324 identified in the non-PIM write instruction 320. In other variations, where there is not a one-to-one mapping, the memory controller 310 allocates an entry 406 that includes the PIM register index of the PIM register 326 and the memory location 324. For example, in the example of FIG. 4, the memory controller 310 writes data 322 to PIM Register 1 and stores the PIM register index of PIM Register 1 and physical address 1 in an entry 406 of the PIM register mapping table 404. In some examples, the memory controller 310 sets a valid bit for the entry 406 to indicate that the entry 406 includes valid write data that must be moved to the memory array. When the memory controller 310 determines that a bank is idle and that there are valid entries for that bank's PIM registers in the PIM register mapping table, the memory controller 310 moves the data in those PIM registers to the memory array using PIM store commands, as previously discussed.

Figure 5:
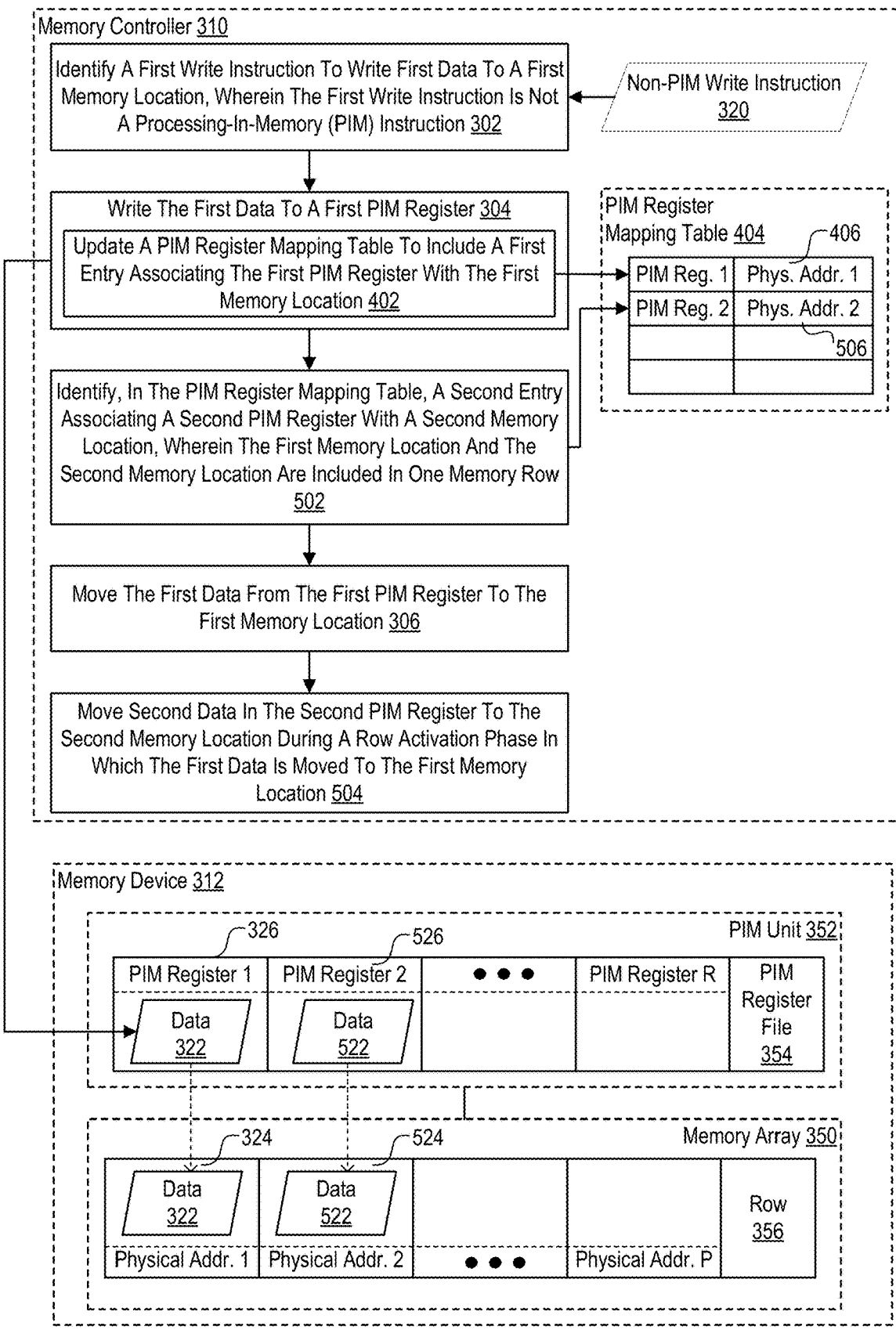
FIG. 5 sets forth a flow chart illustrating another example method of leveraging PIM resources to expedite non-PIM instructions executed on a host in accordance with implementations of the present disclosure.

For further explanation, FIG. 5 sets forth a flow chart illustrating an example method for leveraging processing-in-memory (PIM) resources to expedite non-PIM instructions executed on a host according to some implementations of the present disclosure. The method of FIG. 5 is similar to the method of FIG. 4. However, the method of FIG. 5 also includes identifying 502, in the PIM register mapping table 404, a second entry 506 associating a second PIM register 526 with a second memory location 524, wherein the first memory location 324 and the second memory location 524 are included in one memory row. In some implementation, the memory controller 310 determines whether two or more valid entries in the PIM register mapping table 404 are associated with memory locations in the same bank row. In such cases, the memory controller 310 moves data in the corresponding PIM registers to the bank row during the same row activation phase. In this way, the row is activated only once to move data for multiple non-PIM write instructions to the memory array. For example, the memory controller 310 can identify that multiple non-PIM write instructions in the write queue access the same bank row, but those instructions are interspersed with non-PIM write instructions that access different bank rows. In such an example, the memory controller 310 can group the instructions to the same bank row by writing the associated data to PIM registers, and then using the PIM register mapping table 404 to track PIM registers holding data that can be moved during a single row activation. In another example, the memory controller 310 can determine that one or more non-PIM write instructions pending in the write queue are directed to the same memory row as data being held in a PIM register. In such an example, the memory controller 310 can wait for the data associated with the pending non-PIM write instruction to be written to a PIM register, and then move the data in both PIM registers to the memory row during the same row activation.

In yet another example, two or more non-PIM write instructions that target the same memory location are coalesced in a PIM register, such that first data in the PIM register associated with a first non-PIM write instruction is overwritten with second data of a subsequent non-PIM write instruction before the first data is ever moved to the memory location in the bank. For example, the memory controller 310 can determine the second non-PIM write instruction enqueued after the first non-PIM write instruction will overwrite first non-PIM write instruction. Instead of writing the data of the first non-PIM write instruction to memory, this data is written to a PIM register to allow subsequent writes to the same memory location to coalesce in the PIM register. In one example, when a non-PIM write instruction is ready for dispatch, the memory controller 310 cross-references the memory location of the ready non-PIM write instruction with other enqueued non-PIM write instructions to determine that the data of the ready non-PIM write instruction should be written to a PIM register. The data of the coalesced non-PIM write instructions in the PIM register is later moved to the memory location opportunistically. In this way, the coalescing of non-PIM write instructions to the same memory location using a PIM register avoids multiple separate rows activations for each of these non-PIM write instructions.

In the example depicted in FIG. 5, the PIM register mapping table includes an entry 506 that was added in response to another non-PIM write instruction to write data 522 to memory location 524 (i.e., 'physical address 2'). Here, the data 522 was written to a different PIM register 526 (i.e., 'PIM Register 2'). Thus, the entry 506 associates PIM Register 2 with physical address 2. In this example, the memory controller 310 determines that physical address 1 and physical address 2 are in the same bank row. Thus, the data 322, 522 in the PIM registers 326, 526 can be moved without closing a current row and opening another row.

The example of FIG. 5 also includes moving second data 522 in the second PIM register 526 to the second memory location 524 during a row activation phase in which the first data 322 is moved to the first memory location 324. In some implementations, the memory controller 310 moves the data 322, 522 in PIM registers 326, 526 concurrently by opening the row that includes the memory locations 324, 524, dispatching a first PIM store command that writes data 322 to the first memory location 324, dispatching a second PIM store command that writes data 522 to the second memory location 524, and ultimately closing the row.

Figure 6:
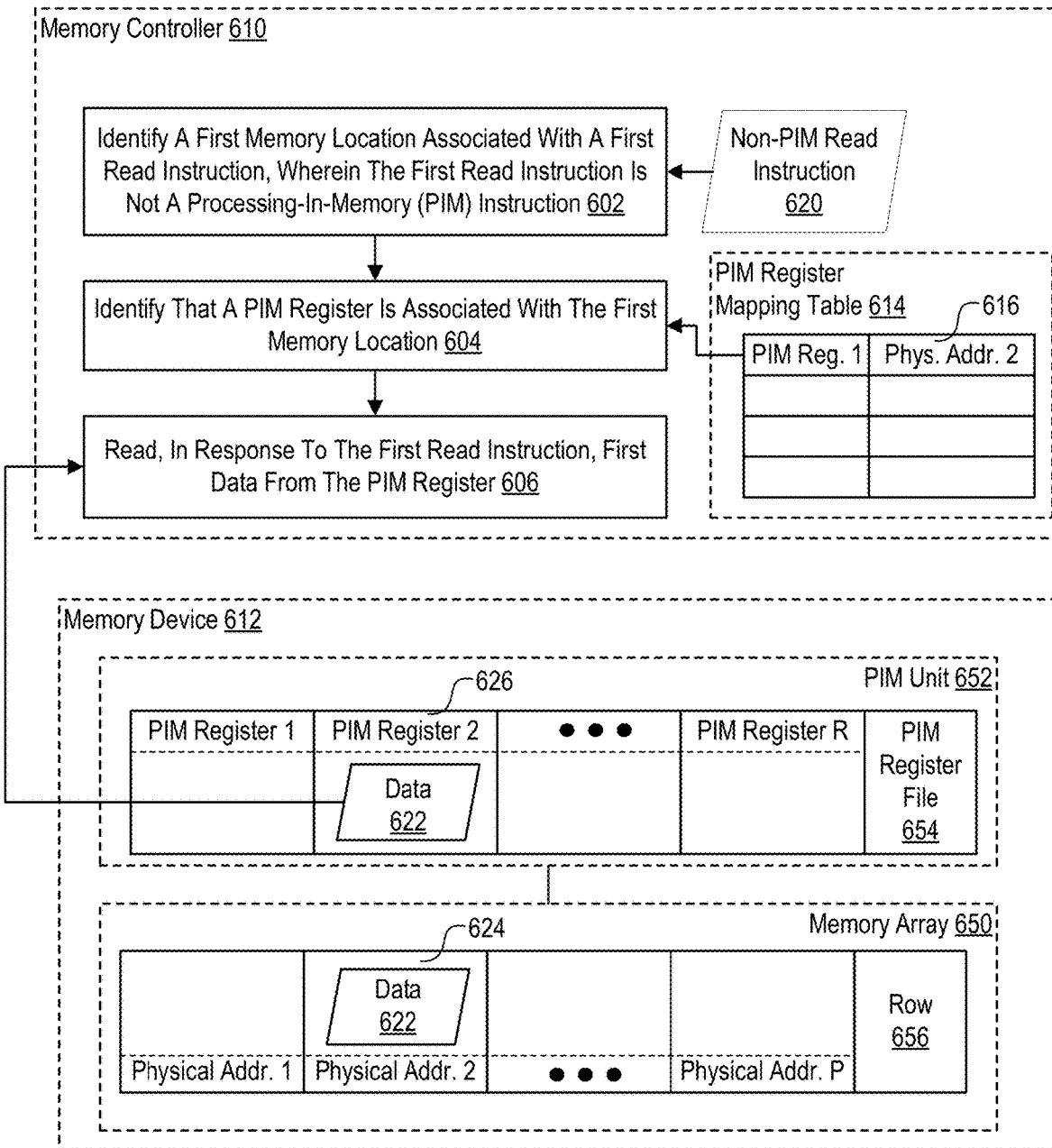
FIG. 6 sets forth a flow chart illustrating another example method of leveraging PIM resources to expedite non-PIM instructions executed on a host in accordance with implementations of the present disclosure.

For further explanation, FIG. 6 sets forth a flow chart illustrating an example method for leveraging processing-in-memory (PIM) resources to expedite non-PIM instructions executed on a host according to some implementations of the present disclosure. The example of FIG. 6 includes a memory controller 610 that can be similar in some or all aspects to the memory controller 140 of FIG. 1, particularly in that the memory controller 610 is configured to dispatch PIM load commands and PIM store commands to move data between a memory location and a PIM register, as well as PIM read commands and PIM write commands to read data from and write data to a PIM register. The example of FIG. 6 also includes a PIM-enabled memory device 612 that can be similar in some or all aspects to the memory device 180 of FIG. 1, particularly in that the memory device 612 includes at least one memory array 650 (e.g., a DRAM bank) coupled to a PIM unit 652 that includes a PIM register file 654. A row 656 in the memory array 650 can include a range of physical addresses 1 to P. For example, a physical address can indicate a row-column address. Although only one row 656 is depicted for the purpose of explanation, it will be appreciated that a memory array will include thousands of rows. The PIM register file 654 includes PIM Registers 1 to R. In some examples, each PIM Register 1 to R is represented by a PIM register index.

The example method of FIG. 6 includes identifying 602 a first memory location 624 associated with a first read instruction 620, wherein the first read instruction 620 is not a processing-in-memory (PIM) instruction. In some examples, the non-PIM read instruction 320 specifies a memory location 624 (e.g., a physical memory address) in the memory array 650 from which data 322 is to be read. In some examples, non-PIM read instructions are queued in a read queue when received at the memory controller 610. When the read instruction 620 is picked by the memory controller 610 identifies the memory location 624 associated with the read instruction 620 and prepares to read the data 622.

The example method of FIG. 6 also includes identifying 604 that a PIM register 626 is associated with the first memory location 624. In some implementations, the memory controller 610 determines whether data targeted by the non-PIM read instruction 620 is stored in a PIM register. For example, the memory controller 610 can track an association between the PIM register 626 and the memory location 624, where the memory location 624 is the source of the data 622 held in the PIM register 626 or the destination of the data 622 held in the PIM register 626. For example, the data 622 held in the PIM register 626 can be data that was written to the PIM register 626 as part of buffering a non-PIM write instruction directed to the memory location 624; or, the data 622 held in the PIM register can be data that was loaded to the PIM register 626 from the memory location 624 through a PIM load command.

In some implementations, the memory controller 610 tracks the association between the PIM register 626 and the memory location 624 using a PIM register mapping table 614, as depicted in FIG. 6. However, it will be appreciated that the memory controller 610 can track an association between PIM registers and memory locations, or the data that is held in the PIM registers, through other techniques. In some examples, the PIM register mapping table 614 includes entries that associate PIM registers to memory locations, as discussed above. In the example of FIG. 6, an entry 616 associates the PIM register 626 with the memory location 624. For example, the entry 616 associates a PIM register index for PIM register 626 and a physical address or partial physical address (e.g., DRAM row-column address) of the memory location 624. Thus, in some examples, when the memory controller 610 takes up the non-PIM read instruction for dispatch to the memory device 612, the memory controller 610 first determines whether the memory location 624 hits on the PIM register mapping table 614. Upon identifying that the memory location 624 is indicated in entry 616, the memory controller 610 determines that the PIM register 626 indicated in the entry 616 holds the data 622 targeted by the non-PIM read instruction.

The example method of FIG. 6 also includes reading 606, in response to the first read instruction 620, a first data 622 from the PIM register 626. In some implementations, to service the non-PIM read instruction 620, the memory controller 610 reads the data 622 held in the PIM register 626 instead of dispatching the non-PIM read instruction to the memory device 612. In some examples, the memory controller 610 reads the data 622 by dispatching a PIM read command.

Figure 7:
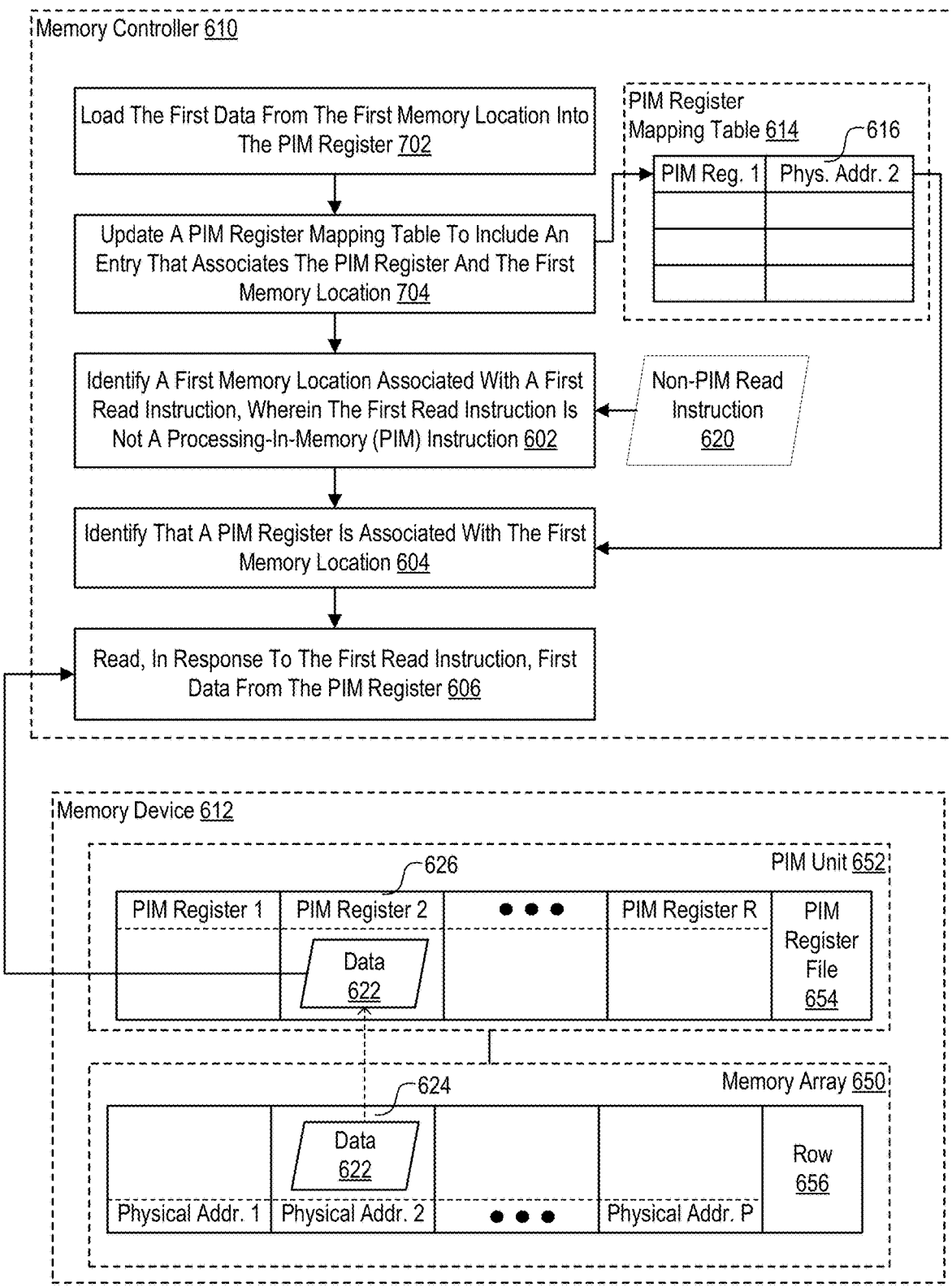
FIG. 7 sets forth a flow chart illustrating another example method of leveraging PIM resources to expedite non-PIM instructions executed on a host in accordance with implementations of the present disclosure.

For further explanation, FIG. 7 sets forth a flow chart illustrating an example method for leveraging processing-in-memory (PIM) resources to expedite non-PIM instructions executed on a host according to some implementations of the present disclosure. The method of FIG. 7 is similar to the method of FIG. 6. However, the method of FIG. 7 also includes loading 702 the first data 622 from the first memory location 624 into the PIM register 626. Prior reading data from a PIM register to service a non-PIM read instruction, the data is first loaded into the PIM register. In some implementations, the memory controller 610 dispatches a PIM load command to the memory device 612. The data 622 can be loaded into the PIM register 626 under a variety of circumstances to expedite the non-PIM read instruction 620.

In some examples, the memory controller 610 identifies the non-PIM read instruction 620 as a pending instruction in the memory controller read queue while the memory channel is in write mode. To reduce read latency for the non-PIM read instruction 620, in these examples the memory controller 610 loads 702 data 622 from the first memory location 624 into the PIM register 626 while the memory channel is in write mode (i.e., the memory controller 610 is actively dispatching write commands and write data in the memory channel). The memory controller can dispatch the PIM load command while the memory channel is in write mode because the PIM load command does not require a transfer of read data over the data bus. In some examples, the data 622 is loaded into the PIM register 626 when the DRAM bank that includes the memory location is in an idle state (i.e., the memory controller 610 is not writing data to the DRAM bank). When the memory channel changes to the read mode, the data 622 is read 606 from the PIM register 626, without incurring latency associated with closing an open row and activating the row that includes the memory location. Thus, the PIM register 626 acts as a staging buffer for the non-PIM read instruction, which improves performance and energy-efficiency.

In some examples, the memory controller 610 loads 702 data 622 from the memory location 624 into the PIM register 626 based on speculation instead of the presence of the non-PIM read instruction 620 in the memory controller read queue. For example, the memory controller 610 can employ a variety of heuristics for speculating which memory locations should be targets of a PIM load command. In one example, the memory controller 610 can track patterns of columns accessed by read instructions to the same memory row and issue a PIM load command to prefetch one or more of the remaining columns of the memory row to the PIM registers. If the column address pattern of read instructions is accessing the same row in sequential column order, one heuristic is to prefetch the next sequential unread column of the row into a PIM register before closing an open row. In another example, the memory controller 610 preloads PIM registers with data from the memory bank for frequently accessed memory row(s). For example, the memory controller 610 can use a table to track rows that are frequently accessed per bank. Before the memory controller 610 closes a frequently accessed memory row, the memory controller can dispatch PIM load commands to copy unread columns from the row into the PIM registers. The memory controller 610 can use the next sequential column heuristic mentioned above, or other prefetch algorithms that will be recognized by those of skill in the art.

The method of FIG. 7 also includes updating 704 a PIM register mapping table 614 to include an entry 616 that associates the PIM register 626 and the first memory location 624. In some implementations, upon loading the data 622 into the PIM register 626, the memory controller 610 indicates in the PIM register mapping table 614 that the PIM register 626 holds data 622 associated with the memory location 624, as discussed above. For example, the entry 616 can include a PIM register index of the PIM register 626 and a physical address or partial physical address (e.g., a memory bank row-com address) of the memory location 624. In the example of FIG. 7, the entry 616 indicates that PIM register 1 holds data associated with physical address 2 (i.e., memory location 624). In some examples, the memory controller 610 marks the entry 616 as holding valid read data.

Figure 8:
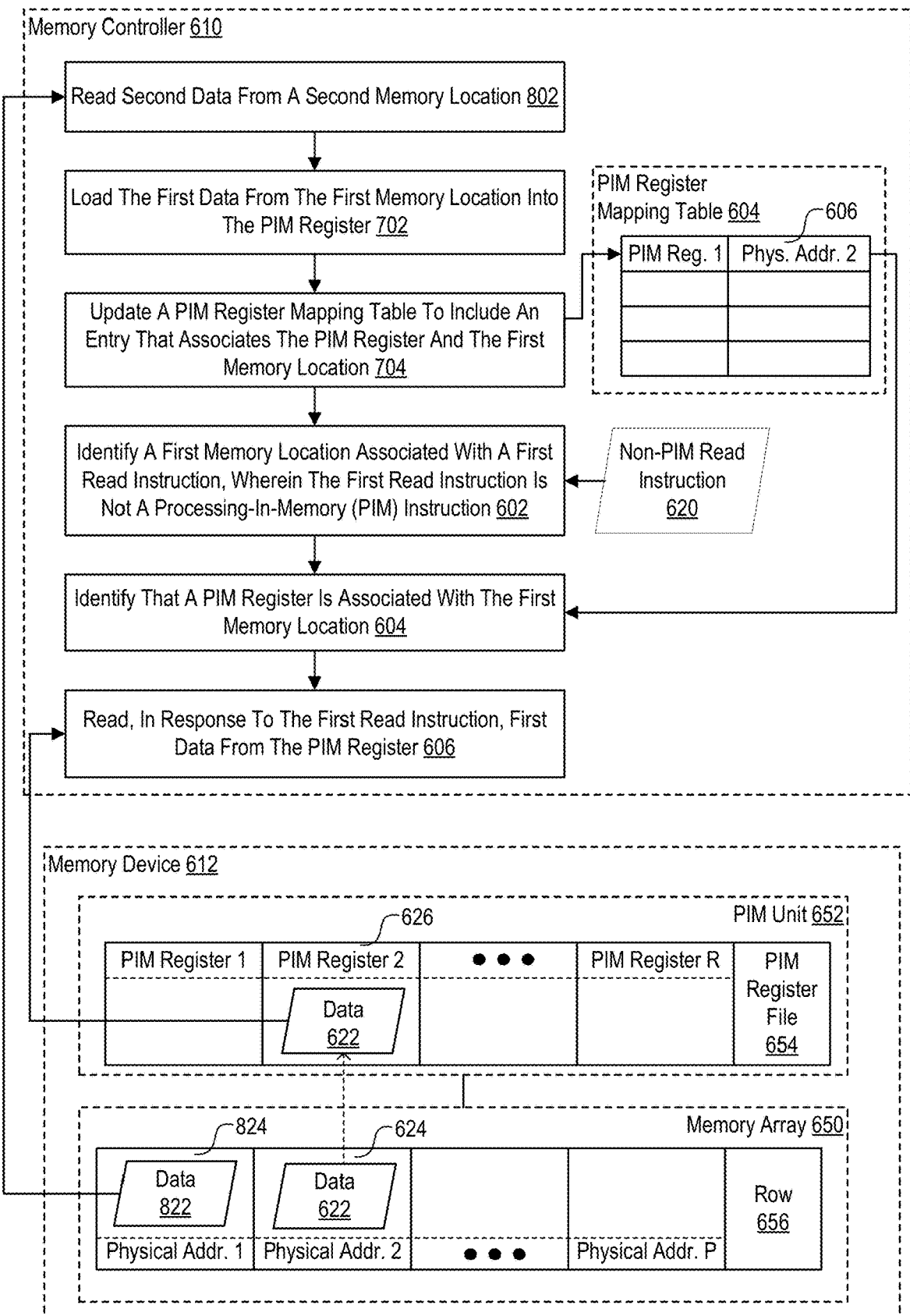
FIG. 8 sets forth a flow chart illustrating another example method of leveraging PIM resources to expedite non-PIM instructions executed on a host in accordance with implementations of the present disclosure.

For further explanation, FIG. 8 sets forth a flow chart illustrating an example method for leveraging processing-in-memory (PIM) resources to expedite non-PIM instructions executed on a host according to some implementations of the present disclosure. The method of FIG. 8 is similar to the method of FIG. 7. However, the method of FIG. 8 also includes reading second data 822 from a second memory location 824, wherein the first memory location 624 and the second memory location 824 correspond to sequential columns in a memory row. In some examples, the memory controller 610 loads 702 the data 622 from the first memory location 624 in a first column into the first PIM register 626 based on a preceding non-PIM read instruction reading data from the second memory location 824 in an adjacent column of the memory row 656. Consider an example where there are two non-PIM read instructions pending in the read queue that access sequential columns A1 and A2 (e.g., physical address 1 and physical address 2) of a memory row 656, and then another read instruction to different memory row that require the row 656 to be closed. Typically, the memory controller dispatches a command to open the row 656, then dispatches a read command to column A1, then dispatches a read command to column A2, and then closes row R. Here, the memory controller 610 dispatches a command to open the row 656, then dispatches a command that combines a read of data 822 column A1 and a PIM load command to load data 622 from column A2 into the PIM register 626, then closes the row 656. Thus, the row 656 can be closed earlier than in the typical case, allowing a new row to be activated earlier than in the typical case, and thus reducing overall latency for the read instruction accessing a new row. It is assumed here that the data bus within the memory bank supports a parallel transfer of data from two columns, one over the host-memory data bus and another to a PIM register. However, only one column is transferred over the host-memory data bus, and thus does not require an increase to the bus lanes.

In one variation of the above, to avoid widening the command bus to send a non-PIM read command (i.e., a command to read from the bank array) and a PIM load command in parallel, a non-PIM read command and a PIM load command can be combined into a single special command. Thus, when a special read command reads data from a column in a memory bank row, data in the next sequential column is loaded into the specified PIM register(s). This does not require additional column address bits because data is always fetched from the next sequential column. Thus, in some examples, this instruction is used to read data 822 from memory location 824 over the data bus while concurrently loading data 622 from memory location 624 into a PIM register 626.

In another variation of the above, to close a memory row early, a PIM write command to read the data 622 from the PIM register is combined with a command to close a memory row. For example, the memory controller 610 can issue a special command that reads data 622 from PIM register 626 while simultaneously closing row 656. This operation is possible because the data 622 has already been read from row 656 into the PIM register. The closing of the open row in parallel with reading data from the PIM register allows for a new row to be activated earlier than in the typical case described above.

In view of the above disclosure, readers will appreciate that implementations of the present disclosure support expediting non-PIM instructions using idle PIM resources. The use of PIM registers as write buffers increases the rate at which write instructions can be drained from memory controller write queues, which decreases the amount of time the memory channel spends in write mode. This, in turn, expedites switching the memory channel to read mode to process pending non-PIM read instructions. The use of PIM registers as read buffers decreases read latency by transferring data to PIM registers in advance of dispatching the non-PIM read instruction because it does not require the non-PIM read instruction to open the row when it is dispatched by the memory controller. Further, the grouping of data transfers between PIM registers and DRAM when a memory row is activated conserves energy and improves performance.

Implementations can be a system, an apparatus, a method, and/or logic. Computer readable program instructions in the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages, as well as functional programming languages. In some implementations, electronic circuitry including, for example, programmable logic circuitry, field-programmable gate arrays (FPGA), or programmable logic arrays (PLA) can execute the computer readable program instructions by utilizing state information of the computer readable program instructions.

Aspects of the present disclosure are described herein with reference to flowchart illustrations and/or block diagrams of methods, apparatus (systems), and logic circuitry according to some implementations of the disclosure. It will be understood that each block of the flowchart illustrations and/or block diagrams, and combinations of blocks in the flowchart illustrations and/or block diagrams, can be implemented by logic circuitry.

The logic circuitry can be implemented in a processor (e.g., a CPU, GPU, or accelerator), other programmable data processing apparatus, or other device to cause a series of operational steps to be performed on the processor, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and logic circuitry according to various implementations of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

While the present disclosure has been particularly shown and described with reference to implementations thereof, it will be understood that various changes in form and details can be made therein without departing from the spirit and scope of the following claims. Therefore, the implementations described herein should be considered in a descriptive sense only and not for purposes of limitation. The present disclosure is defined not by the detailed description but by the appended claims, and all differences within the scope will be construed as being included in the present disclosure.

What is claimed is:

1. A method comprising:
   writing first data of a first write instruction to a first processing-in-memory (PIM) register, wherein the first write instruction is not a PIM instruction, and wherein the first data is written to the first PIM register by dispatching a PIM command; and
   moving the first data from the first PIM register to a first memory location.

2. The method of claim 1, further comprising:
   identifying the first write instruction to write the first data to the first memory location.

3. The method of claim 1, wherein the first data is moved to the first memory location during a bank idle period.

4. The method of claim 1, wherein the first data is moved to the first memory location while a memory channel is in a read mode.

5. The method of claim 1, where the first data is written to the first PIM register by dispatching a PIM write command; and wherein the first data is stored at the first memory location by dispatching a PIM store command.

6. The method of claim 1, wherein writing the first data to the first PIM register includes:
updating a PIM register mapping table to include a first entry associating the first PIM register with the first memory location.

7. The method of claim 6 further comprising:
identifying, in the PIM register mapping table, a second entry associating a second PIM register with a second memory location, wherein the first memory location and the second memory location are included in one memory row; and
moving second data in the second PIM register to the second memory location during a row activation phase in which the first data is moved to the first memory location.

8. A method comprising:
receiving a first read instruction associated with a first memory location, wherein the first read instruction is not a processing-in-memory (PIM) instruction; and
reading, in response to the first read instruction, first data from a PIM register wherein the first data is read from the PIM register by dispatching a PIM command.

9. The method of claim 8, further comprising identifying that the PIM register is associated with the first memory location.

10. The method of claim 8, wherein an entry in a PIM register mapping table associates the first PIM register with the first memory location.

11. The method of claim 8, wherein the first data is read from the PIM register by dispatching a PIM read command.

12. The method of claim 8 further comprising:
loading the first data from the first memory location into the PIM register; and
updating a PIM register mapping table to include an entry that associates the PIM register and the first memory location.

13. The method of claim 12, wherein the first data is loaded into the PIM register by dispatching a PIM load command.

14. The method of claim 12, wherein the first data is loaded into the PIM register while a memory channel is in write mode; and wherein the first data is read from the PIM register while the memory channel is in a read mode.

15. The method of claim 12, wherein the first data is loaded into the PIM register speculatively.

16. The method of claim 12 further comprising:
reading second data from a second memory location, wherein the first memory location and the second memory location correspond to sequential columns in a memory row;
wherein the first data is loaded from the first memory location into the PIM register while the second data is read from the second memory location.

17. The method of claim 16, wherein a single command is dispatched to read the second data from the second memory location and load the first data from the first memory location.

18. The method of claim 16, wherein a single command is dispatched to read the first data from PIM register and close the memory row.

19. An apparatus comprising:
a processor; and
a memory controller, the memory controller including logic configured to:
write first data of a first write instruction to a first processing-in-memory (PIM) register, wherein the first write instruction is not a PIM instruction, and wherein the first data is written to the first PIM register by dispatching a PIM command; and
move the first data from the first PIM register to a first memory location.

20. The apparatus of claim 19, wherein the memory controller also includes logic configured to identify the first write instruction to write the first data to the first memory location.

21. The apparatus of claim 19, wherein writing the first data to the first PIM register includes:
updating a PIM register mapping table to include a first entry associating the first PIM register with the first memory location.

22. The apparatus of claim 19, wherein the first data is written to the first PIM register during a bank refresh period.

23. The apparatus of claim 19, wherein the first data is moved to the first memory location while a memory channel is in a read mode.

24. An apparatus comprising:
a processor; and
a memory controller, the memory controller including logic configured to:
receive a first read instruction associated with a first memory location, wherein the first read instruction is not a processing-in-memory (PIM) instruction; and
read, in response to the first read instruction, first data from a PIM register wherein the first data is read from the PIM register by dispatching a PIM command.

25. The apparatus of claim 24, wherein an entry in a PIM register mapping table associates the first PIM register with the first memory location.

26. The apparatus of claim 24 wherein the memory controller includes logic configured to:
load the first data from the first memory location into the PIM register; and
update a PIM register mapping table to include an entry that associates the PIM register and the first memory location.

27. The apparatus of claim 26, wherein the first data is loaded into the PIM register while a memory channel is in write mode; and wherein the first data is read from the PIM register while the memory channel is in a read mode.

28. A system comprising:
a processor;
a memory controller; and
processing-in-memory (PIM) enabled memory, wherein the memory controller comprises logic configured to:
in response to a read instruction associated with a first memory location: read first data from a PIM register of the PIM enabled memory, wherein the read instruction is not a PIM instruction, and wherein the first data is read from the PIM register by dispatching a first PIM command; and
in response to a write instruction associated with a second memory location: write second data of the write instruction to a second PIM register, wherein the write instruction is not a PIM instruction, and wherein the second data is written to the second PIM register by dispatching a second PIM command; and move the second data from the second PIM register to the second memory location.

29. The system of claim 28, wherein the first data is loaded into the PIM register while a memory channel is in write mode; and wherein the first data is read from the PIM register while the memory channel is in a read mode.

30. The system of claim 28, wherein the second data is written to the second PIM register during a bank refresh period.

31. The system of claim 28, wherein the second data is moved to the second memory location while a memory channel is in a read mode.

* * * * *